US012379207B2

(12) United States Patent
Zhao et al.

(10) Patent No.: US 12,379,207 B2
(45) Date of Patent: Aug. 5, 2025

(54) MEASUREMENT SYSTEM FOR DETECTING DEEP-HOLE SURFACE TOPOGRAPHY BASED ON LOW-COHERENCE INTERFEROMETRY

(71) Applicant: HEFEI UNIVERSITY OF TECHNOLOGY, Anhui (CN)

(72) Inventors: Huining Zhao, Anhui (CN); Xiaoying Hou, Anhui (CN); Jie Wang, Anhui (CN); Liandong Yu, Anhui (CN); Haojie Xia, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 217 days.

(21) Appl. No.: 18/469,792

(22) Filed: Sep. 19, 2023

(65) Prior Publication Data

US 2024/0167812 A1 May 23, 2024

(30) Foreign Application Priority Data

Nov. 22, 2022 (CN) .......................... 202211468113.5

(51) Int. Cl.
*G01B 11/24* (2006.01)
*G01B 9/0209* (2022.01)
*G01N 21/954* (2006.01)

(52) U.S. Cl.
CPC ........ *G01B 11/2441* (2013.01); *G01B 9/0209* (2013.01); *G01N 21/954* (2013.01)

(58) Field of Classification Search
CPC . G01B 9/0209; G01B 11/2441; G01N 21/954
See application file for complete search history.

(56) References Cited

U.S. PATENT DOCUMENTS 3,738,754 A * 6/1973 Marcy ....................... G03F 9/70
356/498
2013/0038863 A1 * 2/2013 Fresquet ............ G02B 21/0016
356/73

(Continued)

FOREIGN PATENT DOCUMENTS

DE 102011012611 A1 * 8/2012 ............. G01B 11/26
DE 102020102959 A1 * 8/2021 ......... G01B 11/2441

*Primary Examiner* — Michael A Lyons
(74) *Attorney, Agent, or Firm* — Mark T. Vogelbacker; Eckert Seamans Cherin & Mellott, LLC

(57) ABSTRACT

A measurement system for detecting deep-hole surface topography based on low-coherence interferometry (LCI) can include a detection part and an autocollimation system. The detection part includes a white light interferometric system, which specifically includes a 1550 nm amplified spontaneous emission (ASE) broadband light source, a first reflector, a first beam splitting prism, a second reflector, and a reference reflector that are arranged in sequence, where a to-be-measured deep-hole and a near-infrared camera are respectively arranged at two sides of the first beam splitting prism, and a conical prism is disposed inside the to-be-measured deep-hole. The autocollimation system is disposed between the to-be-measured deep-hole and the first beam-splitting prism. The autocollimation system includes a 630 nm light source, a dichroic prism, a second beam-splitting prism, a third reflector, and a quadrant detector that are arranged in sequence.

5 Claims, 3 Drawing Sheets

(56) References Cited

U.S. PATENT DOCUMENTS

2016/0039045 A1\* 2/2016 Webster ............. B23K 26/0643
356/450
2016/0187265 A1\* 6/2016 Rudolf ................. H04N 23/698
356/626

\* cited by examiner

MEASUREMENT SYSTEM FOR DETECTING DEEP-HOLE SURFACE TOPOGRAPHY BASED ON LOW-COHERENCE INTERFEROMETRY

CROSS REFERENCE TO RELATED APPLICATION

This patent application claims the benefit and priority of Chinese Patent Application No. 202211468113.5, filed with the China National Intellectual Property Administration on Nov. 22, 2022, the disclosure of which is incorporated by reference herein in its entirety as part of the present application.

TECHNICAL FIELD

The present disclosure relates to the field of precision measurement, and in particular, to a measurement system for detecting deep-hole surface topography based on low-coherence interferometry (LCI).

BACKGROUND

In the industry fields, deep-holes are important components of various instruments and industrial products, such as deep-holes in engine spindles and landing gears of aircrafts, deep-holes in turbine valve casings, and deep-holes in tube plates of steam generators.

The detection of surface topography of deep-holes can be divided into two categories: contact measurement and non-contact measurement. Traditional measurement methods involve surface roughness gauges, roundness gauges, and 3D surface profilometers. There are two types of measurement structures for roundness gauges. In the first type, the measuring head rotates with the spindle, but it is not suitable for measuring the surface topography of deep-holes due to difficulties in vertical or horizontal movement of the measuring head or rod. In the second type, the measuring head is kept stationary while the workpiece rotates with the worktable, but the rotational accuracy of the worktable in such a structure is poor. The disadvantage of surface roughness gauges is that they have fewer measurement parameters, inflexible measurement methods, and lower measurement accuracy, which do not meet the standards of high-precision measurement. 3D surface profilometers can reconstruct the surface topography of deep-holes in three dimensions, but they are expensive, with each unit costing 1 to 2 million RMB. There are some problems with the aforementioned traditional measurement methods, such as the inability to measure scratches and depths of deep-holes, single-function measurement, inability to measure multiple parameters simultaneously, and high cost.

To address the above-mentioned issues, the present disclosure provides a non-contact measurement system and method for detecting deep-hole surface topography. Firstly, a non-contact and multi-parameter approach is adopted. The non-contact measurement is to solve the problem that the measuring head affects the surface topography during contact measurement. Secondly, the system has a fast acquisition speed, allowing for the simultaneous acquisition of the three-dimensional contour of the surface topography. Finally, the system has a low cost, making it affordable, and an autocollimation system is adopted to improve measurement accuracy.

SUMMARY

An objective of the present disclosure is to design an apparatus that combines a low-coherence interferometric system with an autocollimation system to measure the surface topography contour of a deep-hole and detect surface defects and scratches in the deep-hole. The apparatus can construct the surface topography of the deep-hole in one step and achieve automatic full inspection, point cloud reconstruction, and automatic evaluation.

To achieve the foregoing objective of the present disclosure, the present disclosure provides a measurement system and method for detecting deep-hole surface topography based on LCI, including a detection part and an autocollimation system. The detection part includes a white light interferometric system, which specifically includes a 1550 nm amplified spontaneous emission (ASE) broadband light source 1, a first reflector 3, a first beam splitting prism 4, a second reflector 7, and a reference reflector 8 that are arranged in sequence, where a to-be-measured deep-hole 5 and a near-infrared camera 10 are respectively arranged at two sides of the first beam splitting prism 4, and a conical prism 6 is disposed inside the to-be-measured deep-hole 5.

The light emitted by the 1550 nm ASE broadband light source 1 of the white light interferometric system passes through the first reflector 3 and enters the beam-splitting prism 4 to split into two beams of light. One beam of light is reflected by the second reflector 7 to reach the reference reflector 8, and then returns to the beam-splitting prism 4, while the other beam of light returns to the beam-splitting prism 4 after being reflected by the conical prism 6. The two beams of light interfere with each other, and an interference pattern is captured by the near-infrared camera 10.

The autocollimation system is disposed between the to-be-measured deep-hole 5 and the first beam-splitting prism 4. The autocollimation system includes a 630 nm light source 11, a dichroic prism 13, a second beam splitting prism 14, a third reflector 15, and a quadrant detector 16 that are arranged in sequence. The dichroic prism 13 and the second beam-splitting prism 14 are arranged on an optical path between the to-be-measured deep-hole 5 and the first beam-splitting prism 4.

The autocollimation system detects an inclined portion of a rod where the to-be-measured deep-hole 5 is located. Specifically, light emitted by the 630 nm light source 11 is reflected by the dichroic prism 13 onto the second beam splitting prism 14 into two beams of light. One beam of the light is reflected by the third reflector 15 onto the quadrant detector 16, while the other beam of light returns to the second beam splitting prism 14 after being reflected by the conical prism 6, and is reflected by the third reflector 15 onto the quadrant detector 16. If a light spot is not at the center of the quadrant detector 16, it indicates that the rod is tilted. The rod is adjusted until the light spot is at the center of the quadrant detector 16.

Preferably, a first achromatic lens 2 is further disposed between the 1550 nm ASE broadband light source 1 and the first reflector 3.

Preferably, a second achromatic lens 12 is disposed between the 630 nm light source 11 and the dichroic prism 13.

More preferably, the conical prism 6 includes a conical surface with a flat top. The top of the conical surface is integrated with a plane mirror.

In a more preferred technical solution, the reference reflector 8 is fixed on a high-precision displacement stage 9.

Compared with the prior art, the present disclosure has the following beneficial effects:

The prisms and lenses used in the measurement system and method for detecting deep-hole surface topography based on LCI in the present disclosure have lower costs.

Compared with traditional measurement instruments, the present disclosure has a high level of integration and can achieve one-time scanning of the surface topography of the deep-hole. Multiple measurements are conducted, and a measurement result is obtained through a four-step phase-shifting algorithm, a stitching algorithm, and an alignment algorithm, thereby reconstructing the 3D surface topography. By designing the autocollimation system in the apparatus, errors caused by misalignment when the rod is horizontally placed can be detected and compensated for. Ultimately, the present disclosure achieves automatic full inspection, point cloud reconstruction, and automatic evaluation.

BRIEF DESCRIPTION OF THE DRAWINGS

The accompanying drawings incorporated into this specification and constituting a part of this specification illustrate the embodiments of the present disclosure, and are used together with this specification to explain the principles of the present disclosure.

DETAILED DESCRIPTION OF THE EMBODIMENTS

Figure 1:
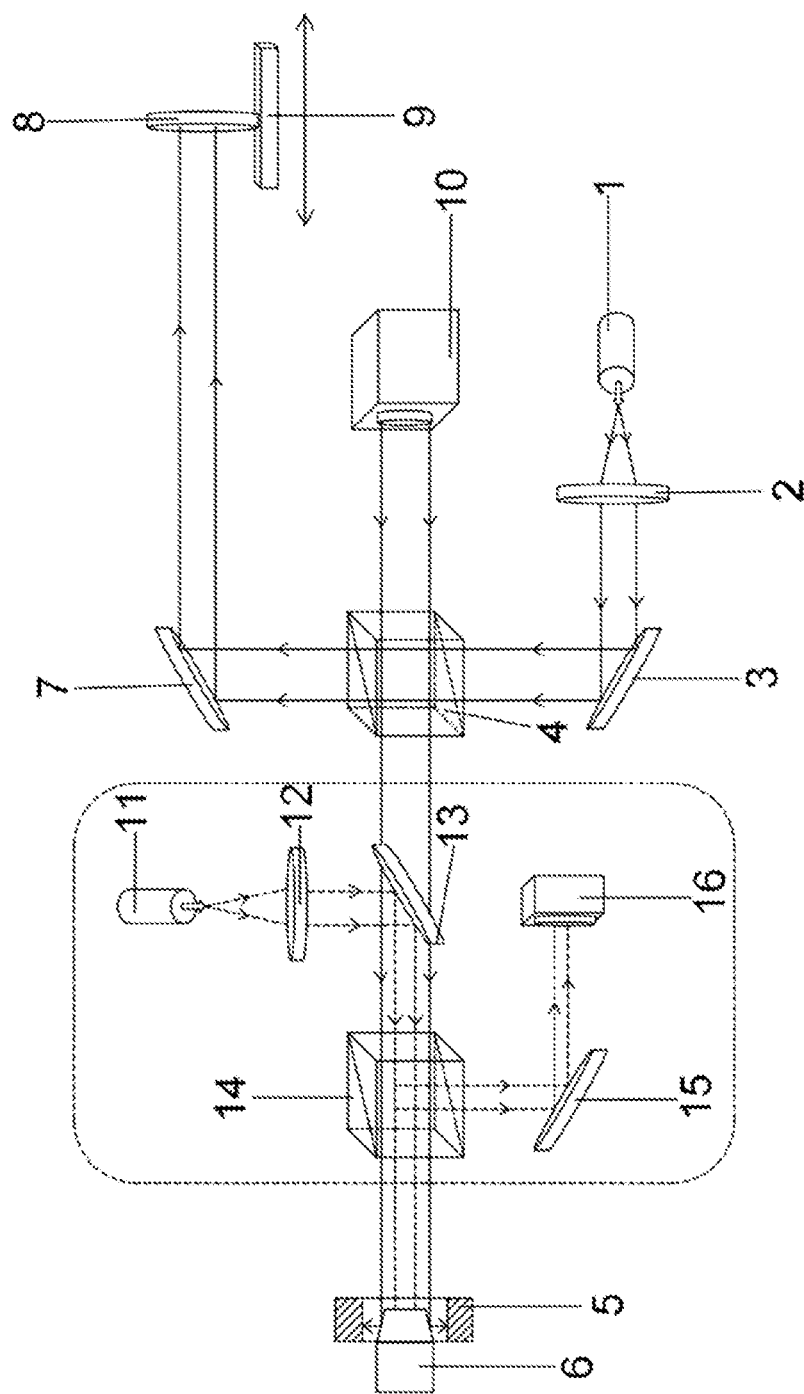
FIG. 1 is a principle schematic diagram of a measurement system and method for detecting deep-hole surface topography based on LCI according to the present disclosure.

The technical solutions in the embodiments of the present disclosure are described clearly and completely below concerning the drawings.

The present disclosure provides a measurement system and method for detecting deep-hole surface topography based on LCI, including a detection part and an autocollimation system. The detection part includes a white light interferometric system, which specifically includes a 1550 nm ASE broadband light source 1, a first reflector 3, a first beam splitting prism 4, a second reflector 7, and a reference reflector 8, where a to-be-measured deep-hole 5 and a near-infrared camera 10 are respectively arranged at two sides of the first beam splitting prism 4, and a conical prism 6 is disposed inside the to-be-measured deep-hole 5. A first achromatic lens 2 is further disposed between the 1550 nm ASE broadband light source 1 and the first reflector 3. The reference reflector 8 is fixed on a high-precision displacement stage 9. The conical prism 6 is placed into the to-be-measured deep-hole 5.

The autocollimation system includes a 630 nm light source 11, a dichroic prism 13, a second beam splitting prism 14, a third reflector 15, and a quadrant detector 16 that are arranged in sequence. The dichroic prism 13 and the second beam-splitting prism 14 are arranged on an optical path between the to-be-measured deep-hole 5 and the first beam-splitting prism 4. A second achromatic lens 12 is disposed between the 630 nm light source 11 and the dichroic prism 13.

The first beam splitting prism 4 is used for splitting near-infrared light in the range of 700-1100 nm, and the second beam splitting prism 14 is used for splitting visible light in the range of 400-700 nm.

In the white light interferometric system, the first achromatic lens 2 changes the beam diameter and the divergence angle of the broadband light source, and light emitted by the broadband light source becomes a parallel beam after passing through the first achromatic lens 2. The functions of the first reflector 3 and the second reflector 7 are both to change the propagation direction of the optical path and increase the length of the optical path. The reference reflector 8, fixed on the high-precision displacement stage 9, serves as a reference reflection arm. By moving the reference reflector 8 through the high-precision displacement stage 9, a surface topography contour of a deep-hole in a rod under test can be scanned. The near-infrared camera 10 captures an interference pattern.

In the autocollimation system, the second achromatic lens 12 changes the beam diameter and divergence angle of the broadband light source, and light emitted by the broadband light source becomes a parallel beam after passing through the second achromatic lens 12. The dichroic prism 13 can selectively transmit or reflect light based on the wavelength of the light, achieving spectral splitting. The dichroic prism 13 only transmits near-infrared light in the white light interferometric system and only reflects visible light in the autocollimation system. The quadrant detector 16 can measure the straightness of the rod under test.

The light emitted by the 1550 nm ASE broadband light source 1 in the white light interferometric system propagates as a parallel beam after passing through the first achromatic lens 2 and enters the beam splitting prism 4 through the first reflector 3 to split into two beams of light. One beam of light is reflected by the second reflector 7 to reach the reference reflector 8 and then returns to the first beam splitting prism 4, while the other beam of light returns to the first beam splitting prism 4 after being reflected by the conical prism 6. The two beams of light interfere with each other, and an interference pattern is captured by the near-infrared camera 10.

By using a four-step phase-shifting algorithm in MATLAB, a position with the strongest interference is calculated for each measurement point, to obtain a relative height of the point, thus achieving the reconstruction of the 3D surface topography.

Interference patterns are captured with a sampling step size of $\lambda_c/4$, resulting in a phase change of $\pi/2$ between two successive interference patterns captured by the camera. Light intensity corresponding to pixels in the interference patterns is as follows:

$$\begin{cases} I_1(x, y) = I_0(x, y) + A(x, y)\cos[\phi(x, y)] \\ I_2(x, y) = I_0(x, y) + A(x, y)\cos[\phi(x, y) + \pi/2] \\ I_3(x, y) = I_0(x, y) + A(x, y)\cos[\phi(x, y) + \pi] \\ I_4(x, y) = I_0(x, y) + A(x, y)\cos[\phi(x, y) + 3\pi/2] \end{cases}$$

For each pixel, the corresponding light intensity values in the four consecutive interference patterns are denoted as $I_1$, $I_2$, $I_3$, $I_4$, with $I_0$ representing a background light intensity value of the camera. A represents a modulation amplitude corresponding to each point, and $\phi$ represents the phase value of the corresponding point.

The combined set of the four equations above can lead to the phase value at the point (x, y):

$$\phi(x, y) = \arctan\left(\frac{I_4 - I_2}{I_1 - I_3}\right)$$

The relative height is as follows:

$$h(x, y) = \frac{1}{8}\lambda N + \frac{\lambda}{4\pi}\phi$$

Here, $\lambda$ is the wavelength of the broadband light source, and N is the number of interference fringes.

3D surface reconstruction can be performed based on the obtained interference fringes to obtain the surface topography of the deep-hole, including surface defects and scratches.

The light emitted by the 630 nm light source 11 of the autocollimation system propagates as a parallel beam after passing through the second achromatic lens 12 and is reflected by the dichroic prism 13 onto the second beam splitting prism 14 to split into two beams of light. One beam of light is reflected by the third reflector 15 onto the quadrant detector 16, while the other beam of light returns to the second beam splitting prism 14 after being reflected by the conical prism 6, and is reflected by the third reflector 15 onto the quadrant detector 16. If a light spot is not at the center of the quadrant detector 16, it indicates that the rod is tilted. The rod is adjusted until the light spot is at the center of the quadrant detector 16.

Figure 2:
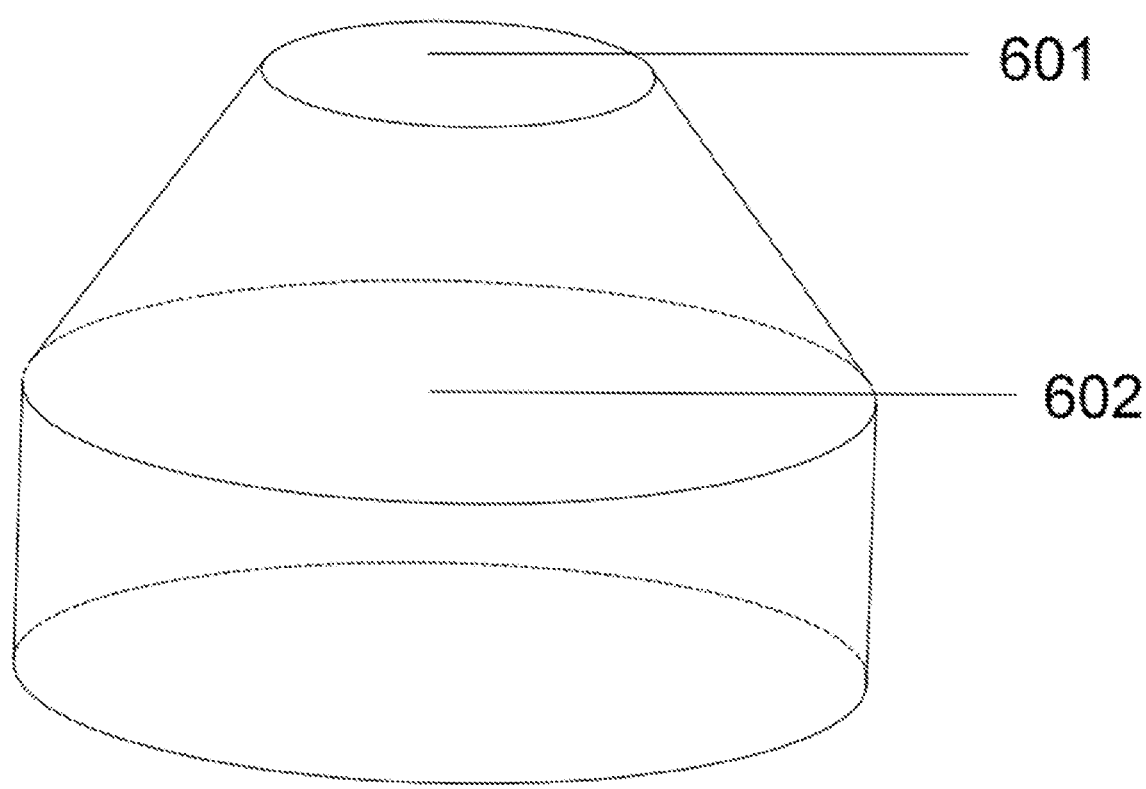
FIG. 2 shows the structure a dedicated conical prism in the present disclosure.

As shown in FIG. 2, the conical prism 6 in the present disclosure combines a flat surface 601 and a conical surface 602 into a whole and is used as a dedicated prism for measurements. The surface topography of the deep-hole is obtained by multiple measurements, and each measurement yields a point cloud. A final measurement point cloud is generated through a stitching algorithm.

Figure 3:
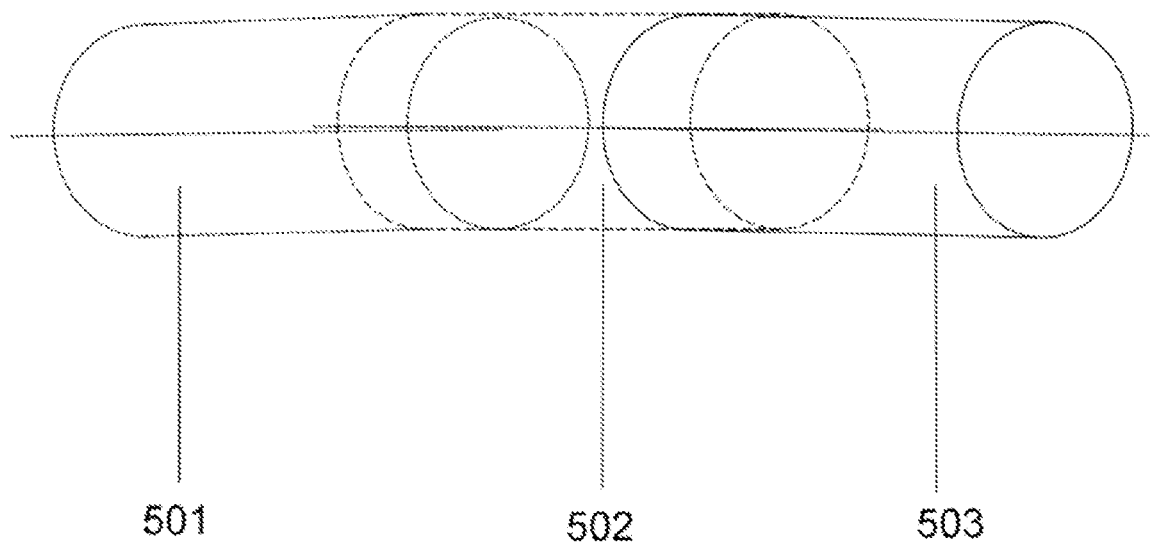
FIG. 3 shows the merging of three measurement point clouds using a stitching algorithm.

FIG. 3 shows the application of the stitching algorithm to merge three measurement point clouds. The process of obtaining the final measurement point cloud using the stitching algorithm is as follows: A first measurement point cloud 501 is selected as an aligned reference cylinder (RC). Then a second measurement point cloud 502 is selected as an unaligned cylinder (MC). The first measurement point cloud 501 is stitched with the second measurement point cloud 502 to serve as a reconstructed reference measurement point cloud. Then, a third measurement point cloud 503 is stitched with the reference measurement point cloud. Subsequent measurement point clouds are stitched in the same way to obtain the final measurement point cloud. An overlapping region is maintained between adjacent measurement point clouds. An alignment algorithm is adopted to ensure that data in the overlapping region between two measurement point clouds is consistent. The core of the alignment algorithm is to calculate the translation and tilt parameters of the cylinder using the least absolute method, to ignore outliers in the measurement point clouds. A new radius is calculated for each point in the unaligned point cloud to obtain a radius of the aligned point cloud, to ensure a smooth transition between the two measurement point clouds. By stitching all the acquired measurement point clouds, the complete surface topography inside the deep-hole can be reconstructed. The main formula of the alignment algorithm is as follows:

According to the least square method:

$$F(x_0, y_0, r_0, k_x, k_y) = \sum_{i=0}^{n-1} |(x_i - x_0 - k_x \cdot z_i)^2 + (y_i - y_0 - k_y \cdot z_i)^2 - r_0^2|$$

$x_i$, $y_i$ and $z_i$ represent the Cartesian coordinates of the unaligned cylinder. n represents the number of points in the unaligned cylinder MC. $(x_0, y_0)$ represents a point in the plane xoy where the axis of the unaligned cylinder MC intersects with z=0. Values of $k_x$ and $k_y$ are related to the tilt angle of the axis of the unaligned cylinder (MC) relative to the z-axis. $r_0$ represents the radius of the cylinder. Values of $x_0$, $y_0$ are values of the rigid body on the x-axis and y-axis, respectively, where the rigid body is required to be aligned with the unaligned cylinder (MC) during translation.

$\theta_x = atn(k_x)$ $\theta_y = atn(k_y)$

A tilt angle of the rod due to gravity is obtained from the foregoing equations. $\theta_x$ represents an angle between the axis of the unaligned cylinder MC and the z-axis in the plane XZ. $\theta_y$ represents an angle between the axis of the unaligned cylinder MC and the z-axis in the plane YZ.

Once the foregoing five parameters are determined, it is necessary to recalculate the radius of each point in the unaligned point cloud to generate the aligned point cloud.

The new radius of each point is calculated based on the following formulas:

$x_1 = -x_0 - k_x * z[i] - r[i] * \cos(\theta[i])$ $y_1 = -y_0 - k_y * z[i] - r[i] * \sin(\theta[i])$ $raligh[i] = sqrt(x_1 * x_1 + y_1 * y_1)$ r[i] represents a radius of the i-th point in the unaligned point cloud. $\theta[i]$ represents a polar angle of the i-th point in the unaligned point cloud. z[i] represents a z-coordinate of the i-th point in the unaligned point cloud. raligh[i] represents a radius of the i-th point after the point cloud is aligned.

In the foregoing formulas, it is assumed that all the cloud data is stored in a one-dimensional matrix. The value of raligh[i] should overwrite the value of the previous r[i]. This process results in an aligned cloud, and the average radius remains unchanged.

Figure 4:
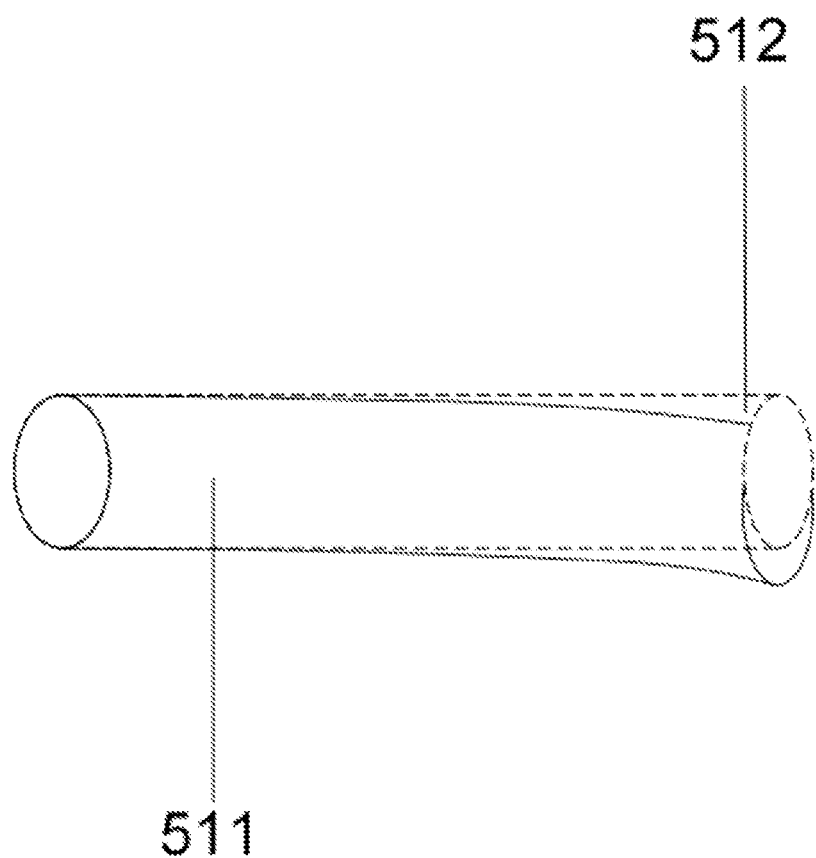
FIG. 4 shows an inclined and bent state of a rod under the influence of gravity.

FIG. 4 shows an inclined and bent state 511 of the rod due to the influence of gravity, while an ideal state 512 unaffected by gravity is shown as a dashed line. The error caused by the tilt of the rod due to gravity during the measurement process can be detected using the autocollimation system. Once the error caused by the tilt of the rod due to gravity is known, it can be compensated for.

The apparatus can detect surface defects and scratches in the deep-hole, construct the surface topography of the deep-hole in one step, and achieve automatic full inspection, point cloud reconstruction, and automatic evaluation.

The described embodiments are merely some rather than all of the embodiments of the present disclosure. All the other embodiments derived by those of ordinary skill in the art based on the embodiments of the present disclosure without creative efforts shall fall within the protection scope of the present disclosure.

What is claimed is:

1. A measurement system for detecting deep-hole surface topography based on low-coherence interferometry (LCI), comprising a detection part and an autocollimation system, wherein the detection part comprises a white light interferometric system that specifically comprises a 1550 nm amplified spontaneous emission (ASE) broadband light source (1), a first reflector (3), a first beam splitting prism (4), a second reflector (7), and a reference reflector (8) that are arranged in sequence; a to-be-measured deep-hole (5) and a near-infrared camera (10) are respectively arranged at two sides of the first beam splitting prism (4), and a conical prism (6) is disposed inside the to-be-measured deep-hole (5);

light emitted by the 1550 nm ASE broadband light source (1) of the white light interferometric system passes through the first reflector (3) and enters the beam-splitting prism (4) to split into two beams of light; one of the two beams of light is reflected by the second reflector (7) to reach the reference reflector (8), and then returns to the beam splitting prism (4), while the other of the two beams of light returns to the beam splitting prism (4) after being reflected by the conical prism (6); the two beams of light interfere with each other, and an interference pattern is captured by the near-infrared camera (10);

the autocollimation system is disposed between the to-be-measured deep-hole (5) and the first beam-splitting prism (4); the autocollimation system comprises a 630 nm light source (11), a dichroic prism (13), a second beam-splitting prism (14), a third reflector (15), and a quadrant detector (16) that are arranged in sequence; the dichroic prism (13) and the second beam splitting prism (14) are arranged on an optical path between the to-be-measured deep-hole (5) and the first beam splitting prism (4); and the autocollimation system detects an inclined portion of a rod where the to-be-measured deep-hole (5) is located; specifically, light emitted by the 630 nm light source (11) is reflected by the dichroic prism (13) onto the second beam-splitting prism (14) to split into two beams of light; one of the two beams of light is reflected by the third reflector (15) onto the quadrant detector (16), while the other of the two beams of light returns to the second beam splitting prism (14) after being reflected by the conical prism (6), and is reflected by the third reflector (15) onto the quadrant detector (16); a light spot not being at the center of the quadrant detector (16) indicates that the rod is tilted, and the rod is adjusted until the light spot is at the center of the quadrant detector (16).

2. The measurement system for detecting deep-hole surface topography based on LCI according to claim 1, wherein a first achromatic lens (2) is further disposed between the 1550 nm ASE broadband light source (1) and the first reflector (3).

3. The measurement system for detecting deep-hole surface topography based on LCI according to claim 1, wherein a second achromatic lens (12) is further disposed between the 630 nm light source (11) and the dichroic prism (13).

4. The measurement system for detecting deep-hole surface topography based on LCI according to claim 1, wherein the conical prism (6) comprises a conical surface with a flat top, and the top of the conical surface is integrated with a plane mirror.

5. The measurement system for detecting deep-hole surface topography based on LCI according to claim 1, wherein the reference reflector (8) is fixed on a high-precision displacement stage (9).

* * * * *